(12) United States Patent
Dwarkaprasad et al.

(10) Patent No.: US 9,648,497 B2
(45) Date of Patent: May 9, 2017

(54) MOBILE TERMINAL AND LOGIN CONTROL METHOD THEREOF

(71) Applicant: Samsung Electronics Co., Ltd., Gyeonggi-do (KR)

(72) Inventors: Dayama Dwarkaprasad, Gyeonggi-do (KR); Das Kumarbrata, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 1 day.

(21) Appl. No.: 14/087,738

(22) Filed: Nov. 22, 2013

(65) Prior Publication Data

US 2014/0162605 A1 Jun. 12, 2014

(30) Foreign Application Priority Data

Dec. 10, 2012 (KR) .......................... 10-2012-0142504

(51) Int. Cl.
*H04W 12/08* (2009.01)
*G06F 21/40* (2013.01)
*H04W 88/02* (2009.01)

(52) U.S. Cl.
CPC ............ *H04W 12/08* (2013.01); *G06F 21/40* (2013.01); *H04W 88/02* (2013.01)

(58) Field of Classification Search
CPC .......... G06F 21/31; G06F 21/40; G06F 21/36; G06F 2200/1637; G06F 2200/1614; H04W 12/06; H04W 12/08; H04W 52/0254; H04W 88/02
See application file for complete search history.

(56) References Cited

U.S. PATENT DOCUMENTS

| 8,023,930 | B2 | 9/2011 | Won |
| 2012/0023573 | A1* | 1/2012 | Shi .................................. 726/17 |
| 2013/0042209 | A1* | 2/2013 | de Leon ........................ 715/863 |
| 2013/0145453 | A1* | 6/2013 | Lemke ..................... G06F 21/31 726/16 |
| 2014/0068755 | A1* | 3/2014 | King et al. ...................... 726/19 |

FOREIGN PATENT DOCUMENTS

JP 2010035061 2/2010

* cited by examiner

*Primary Examiner* — Thai Vu
(74) *Attorney, Agent, or Firm* — The Farrell Law Firm, P.C.

(57) ABSTRACT

A login control method and apparatus is provided for facilitating usage right authentication of a mobile terminal, when the user unlocks the mobile terminal. The login control method includes determining, when a lock image is displayed on a screen, a posture of a mobile terminal, detecting unlock information, comparing the unlock information with a pre-registered unlock information, selecting, when the unlock information and the pre-registered unlock information are identical, an operation mode corresponding to the matched unlock information, from a plurality of operation modes, as the current operation mode, and displaying an image representing the current operation mode.

7 Claims, 14 Drawing Sheets

FIG. 9

- ☐ Internet
- ☐ Call
- ☑ Game 1
- ☑ Game 2
- ☐ Message
- ☐ Camera

MOBILE TERMINAL AND LOGIN CONTROL METHOD THEREOF

PRIORITY

This application claims priority under 35 U.S.C. §119(a) to a Korean patent application filed on Dec. 10, 2012 in the Korean Intellectual Property Office and assigned Serial No. 10-2012-0142504, the contents of which are incorporated herein by reference.

BACKGROUND OF THE INVENTION

1. Field of the Invention

The present invention relates generally to a mobile terminal and login control method thereof and, more particularly, to a method and apparatus for controlling a user's login to the mobile terminal with a posture-based unlock mechanism.

2. Description of the Related Art

Recent mobile terminals, such as a smartphone or tablet Personal Computers (PCs), allow the user to use various functions (such as gaming, Internet access, emailing, call placing, and phonebook functions) and consume various types of contents (such as still and motion pictures and audio files). With the frequent use of private information on the mobile terminal, security is an increasingly significant issue. In this regard, the recent mobile terminals are equipped with the lock mechanism.

For example, if the user pushes the power button usually provided at a side of the mobile terminal, the mobile terminal is locked with the presentation of the lock-up image (i.e. login image) on the screen. In order to use the locked mobile terminal, the user has to unlock the mobile terminal by inputting a pre-registered password. That is, the user logs in to the terminal using the password. Once the mobile terminal is unlocked, anyone can use the unlocked mobile terminal, meaning that all settings and private information stored in the mobile terminal can be exposed to other people and all applications installed in the mobile terminal can be executed by other people.

The mobile terminal can be configured to operate in a restricted operation mode. For example, the mobile terminal can be configured to operate in a limitless operation mode in which all of the applications are executable with a first password and a limited operation mode in which only the call-placing function is allowed with a second password. However, this method is inconvenient since the user has to memorize all registered passwords.

SUMMARY OF THE INVENTION

The present invention has been made in an effort to solve the foregoing problems and it is an object of the present invention to provide a mobile terminal and method for authenticating the user that is capable of facilitating usage right inspection in unlocking the locked mobile terminal (i.e. logging in to the mobile terminal).

In accordance with an aspect of the present invention, a login control method includes determining, when a lock image is displayed on a screen, a posture of a mobile terminal, detecting unlock information, comparing the unlock information with pre-registered unlock information, selecting, when the unlock informations match, an operation mode corresponding to the matched unlock information, a plurality of operation modes, as the current operation mode, and displaying an image representing the current operation mode.

In accordance with another aspect of the present invention, a login control method includes detecting an operation mode configuration request event; displaying, when the operation mode configuration request event is detected, an operation mode list including items representing a limitless operation mode and at least one limited operation mode; determining, when an item is selected from the operation mode list, a posture of a mobile terminal, and saving information on the posture of the mobile terminal along with information of the operation mode corresponding to the selected icon.

In accordance with another aspect of the present invention, a login control method includes detecting an event requesting for usage restriction configuration, displaying, when the event is detected, a list including at least one icon representing at least one application and at least one contents, determining, when an icon is selected from the list, a posture of a mobile terminal, and saving a limited operation mode information including information on the posture of the mobile terminal and information corresponding to the selected icon.

In accordance with another aspect of the present invention, a login control method includes determining a posture of a mobile terminal in screen-off state, detecting an event requesting for screen-on; matching, when the event is detected, an operation mode of the mobile terminal with one of a plurality of pre-registered operation modes which corresponds to the posture, and displaying an image related to the determined operation mode.

In accordance with another aspect of the present invention, a mobile terminal includes a display unit, a sensing unit which senses physical quantity and displacement of the physical quantity, an input unit which generates an event, and a control unit which controls the display unit, the sensing unit, and the input unit, wherein the control unit determines a posture of the mobile terminal based on a sensing information provided by the sensing unit, selects, when a unlock information is input through the input unit when a lock image is displayed on a screen of the display unit, an operation mode corresponding to the posture among a plurality of pre-registered unlock operation modes as current operation mode of the mobile terminal, and controls the display unit to display an image related to the current operation mode.

BRIEF DESCRIPTION OF THE DRAWINGS

The above aspects, features and advantages of the present invention will be more apparent from the following detailed description in conjunction with the accompanying drawings, in which:

FIG. 9 is a diagram illustrating an operation mode list for use in the login control method of FIG. 8.

DETAILED DESCRIPTION OF EMBODIMENTS OF THE INVENTION

Embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

In the following description, the mobile terminal can be any of portable electronic devices such as a smartphone, a tablet Personal Computer (PC), and a laptop PC.

Figure 1:
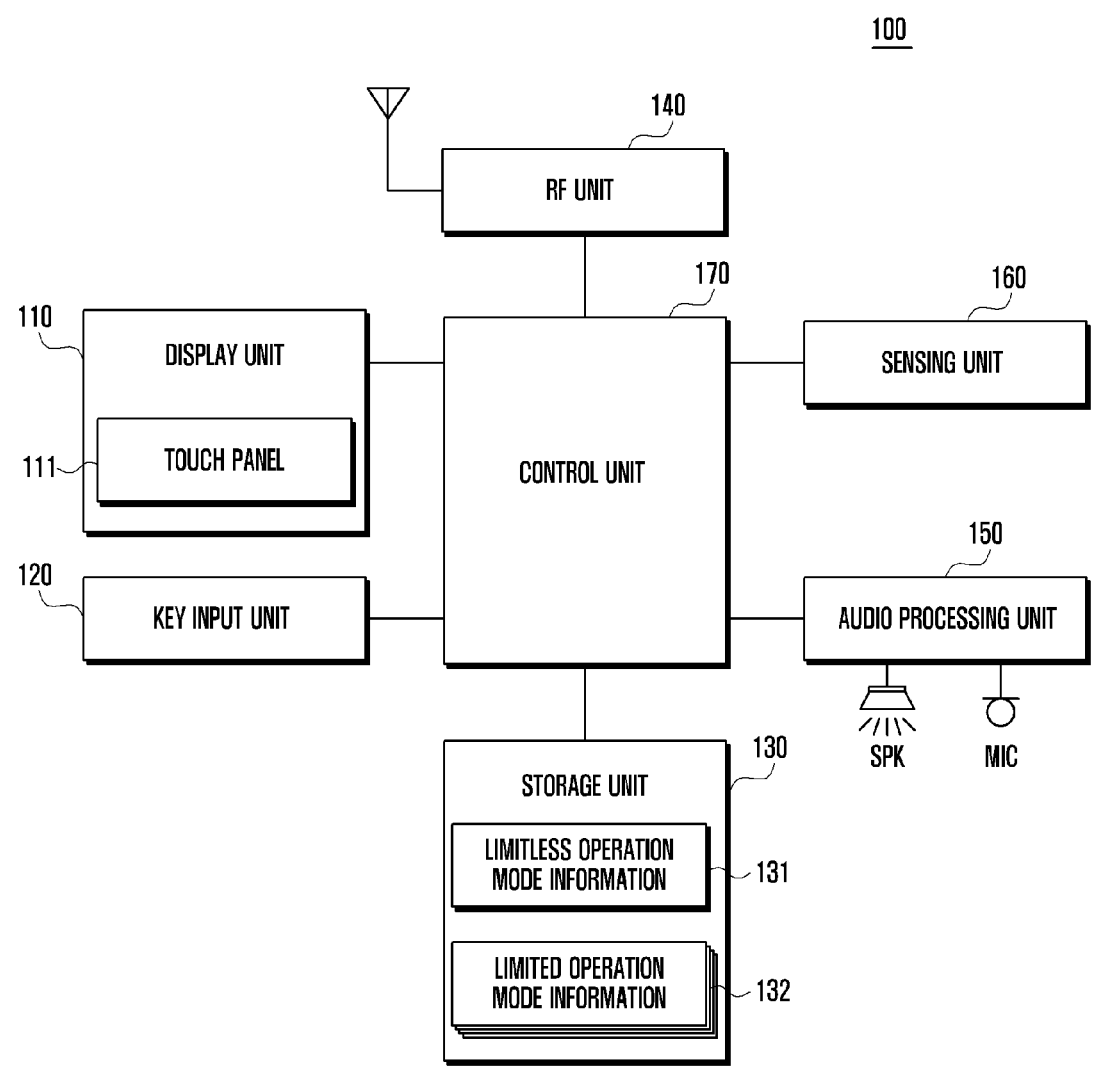
FIG. 1 is a block diagram illustrating the configuration of the mobile terminal according to an embodiment of the present invention.

FIG. 1 is a block diagram illustrating the configuration of the mobile terminal according to an embodiment of the present invention.

Referring to FIG. 1, the mobile terminal 100 includes a display unit 110, a key input unit 120, a storage unit 130, a Radio Frequency (RF) unit 140, an audio processing unit 150, a speaker (SPK), a microphone (MIC), a sensing unit 160, and a control unit 170.

The display unit 110 displays at least one image on the screen under the control of the control unit 170. That is, the control unit 170 processes the data to be displayed on the screen (such as decoding) and stores the processed data in a buffer such that the display unit 110 converts the buffered image data into analog signal to be displayed on the screen. When it is powered on, the display unit 110 displays the lock image (or login image) on the screen. If uplink information (i.e. password) is input when the lock image is displayed, the control unit 170 controls to unlock the mobile terminal 100. That is, the display unit 110 replaces the lock image with another image under the control of the control unit 170. The unlock information can be a numeric text (such as 1234) input by means of the keypad presented on the screen or the key input unit, a track, a direction, or a type of a touch gesture made on the screen of the display unit 110, or a user voice input by means of the MIC.

The image can be any of a home, an application execution, a keypad, or a menu image. The home image may include a plurality of icons aligned on a background image. The icons represent respective applications or contents (such as photo file, video file, recoding file, document, or message). If the user selects one of the icons, such as an application icon, by making a gesture (such as tapping), the control unit 170 executes the corresponding application (such as an SNS application) and controls the display unit 110 to display the execution image. The display unit 110 displays one of the images, such as an application execution image, as the background and another image, such as a keypad image on the foreground to be overlapped with the background image under the control of the control unit 170. The display unit 110 also displays the first image in a first region and a second image in a second region under the control unit control unit 170. The display unit can be implemented with one of Liquid Crystal Display (LCD), Organic Light Emitted Diode (OLED), Active Matrix Organic Light Emitted Diode (AMOLED), and Flexible display.

The touch panel 111 is placed on the display unit 110. In detail, the touch panel 111 can be placed on the screen of the display unit 100 in an add-on type inserted into the display unit 110 in an on-cell type or in-cell type.

The touch panel 111 generates an analog signal (such as a touch event signal) corresponding to a touch gesture made by the user on the touch panel 111, converts the analog signal to a digital signal, and sends the digital signal to the control unit 170. The touch event signal includes touch coordinates (x, y). If the touch coordinates are received from the touch panel 111, the control unit 170 determines that a touch object has contacted the touch panel and, if the touch coordinates are no longer received, determines that the touch has been released. If the touch coordinates change, such as from $(x_1, y_1)$ to $(x_2, y_2)$, the control unit 170 determines that the touch has moved. When the touch moves, the control unit 170 calculates the touch displacement (dx, dy) and movement speed. The control unit 170 can differentiate among user's touch gestures of single touch, multi-touch, tap, double tap, long tap, tap & touch, drag, flick, press, pinch in, and pinch out, based on the touch coordinates, touch release, touch movement, touch displacement, and touch speed, for example.

The single touch denotes the gesture of contacting a point of the touch panel 111 by means of a touch object, the multi-touch denotes the gesture of contacting multiple points of the touch panel 111 by means of a touch object, such as a thumb and index finger, and the tap denotes the gesture in which the touch object contacts and then releases immediately at a point without movement, the double tap denotes of the gesture of tapping twice at a point, the long tap denotes the gesture of maintaining the tap over a time duration without movement, the tap & touch denotes the gesture of tapping at a point on the screen and a subsequent touch in a time (such as 0.5 second), the drag denotes the gesture of contacting at a point on the screen by means of a touch object and moving the touch object without releasing the contact, the flick denotes the gesture of moving the touch object faster than the drag gesture and the releasing the contact of the touch object, the press denotes the gesture of touching and pressing at a point, the pinch-in is the gesture of contacting at two points and narrowing the distance between the two contact points, and the pinch-out is the gesture of contacting at two points and widening the distance between the two contact points.

That is, the touch indicates when a touch object contacts the touch panel 111 and other gestures denote changes in touch state. The touch panel 111 may include a pressure sensor to detect the pressure applied at a point where the touch is made. The sensed pressure information is sent to the control unit 170, which discriminates between touch and press gestures based on the pressure information.

The touch panel 111 can be an integrated touch panel including a hand touch panel for detecting a hand gesture and a pen touch panel for detecting a pen gesture. The hand touch panel is implemented in capacitive type, but can be implemented in resistive type, infrared type, or microwave type. The hand touch panel is capable of detecting the touch event made by means of an object (such as a conductive material object capable of influencing the electric capacitance) as well as the touch even made by means of a user's hand gesture. The pen touch panel can be implemented in an electromagnetic induction type. In this case, the pen touch panel detects the touch even made by means of a stylus pen manufactured to form a magnetic field.

The key input unit 120 includes a plurality of alphanumeric keys for inputting alphanumeric information and function keys for configuring and setting various functions. These keys may include a menu, a screen on/off, a power on/off, and a volume control key, among other keys. The key input unit 120 is capable of generating a key event signal related to the user setting and function control of the mobile terminal 100 to the control unit 170. The key event is capable of a power on/off, a volume control, a screen on/off, and a shutter event, for example. The control unit 170 is capable of controlling the components in response to the key event. The keys of the key input unit 120 are referred to as hard keys while the virtual keys displayed by the display unit 110 are referred to as soft keys.

The storage unit 130 includes at least one of a disk, Random Access Memory (RAM), Read Only Memory (ROM), and flash memory, as the secondary memory unit of the control unit 170. The storage unit stores a limitless operation mode information 131 and at least one limited operation mode information 132. The limitless operation mode information 131 includes the first posture information. When a lock image is displayed, the control unit 170 determines the position of the mobile terminal 100. If the mobile terminal is unlocked, the control unit 170 reads the first posture information out of the storage unit 130 and compares the first posture information with the determined posture information to control the mobile terminal 100 to operate in the limitless when the two informations match. For example, the two informations are identical to each other.

The limited operation mode information 132 includes second posture information. The control unit 170 reads the second posture information out of the storage unit 130 and compares the second posture information with the determined posture information to control the mobile terminal 100 to operate in the limited operation mode when the two informations do not match. In the limited operation mode, the mobile terminal 100 allows for executing only a specific application (such as call-placing application).

The limited operation mode also allows for executing specific functions (such as receiving the inbound call but not placing an outbound call) of the execution-allowed application. The limited operation mode also limits the display to contents (such as photos included in a specific folder of a gallery application). That is, the limited operation mode information 132 includes the information on the functions, application, and contents allowed for use in the limited operation mode.

The storage unit 130 stores a booting program, an Operating System (OS), and applications. The OS works as an interface between the hardware and applications and among the applications and manages the computing resources such as Central Processing Unit (CPU), Graphics Processing Unit (GPU), main storage device, and secondary storage devices. The OS also controls hardware operation and application execution, schedules tasks, controls operations of the CPU and GPU, and manages data and file storage.

The applications are classified into the embedded application and the $3^{rd}$ party applications. The embedded applications may include a web browser application, an email application, and an instant messenger application. The third party applications are those downloaded from an application market server and installed in the mobile terminal 100. If the battery power is supplied to the control unit 170 of the mobile terminal 100, the booting program is loaded on the main memory device (such as Random Access Memory (RAM)) of the control unit 170 first. The booting program loads the OS on the main memory device. The OS loads the application on the main memory device. The storage unit 130 is capable of including a Speech To Text (STT) application for converting voice data to text.

The RF unit 140 is responsible for voice, video, and data communication with another terminal through a network under the control of the control unit 170. The RF unit 140 includes an RF transmitter for frequency up-converting and amplifying the signal to be transmitted and an RF receiver for low noise amplifying and down converting the received signal. The RF unit 140 includes at least one of a cellular communication module (such as 3rd, $3.5^{th}$, and $4^{th}$ Generation mobile communication modules), a digital broadcast module (such as a Digital Mobile Broadcasting (DMB) module), and a short range communication module (such as a Wi-Fi module and a Near Field Communication (NFC) module).

The audio processing unit 150 performs speech recognition, voice recording, and audio signal (such as voice) input and output for digital recording and call processing in cooperation with a SPK and a MIC. The audio processing unit 150 converts the analog audio signal input through the MIC to the digital audio signal and sends the digital audio signal to the control unit 170. The SPK converts the audio signal from the audio processing unit 150 to an audible sound wave. The MIC converts the sound wave of a human voice or output from a sound source to the audio signal. The mobile terminal 100 is capable of including the first and second speakers. The first speaker is responsible for voice communication, so called "receiver". That is, the first speaker is for use in voice communication. The second speaker is for use in listening to music and audio output of audiovisual content as well as voice communication, so called "loud speaker".

The sensing unit 160 detects physical quantity (such as brightness, velocity, acceleration, altitude, and gravity) or its variation to generate the detection information to the control unit 170. The sensing unit 160 includes at least one of an acceleration sensor, an orientation sensor, a gyroscope, and a terrestrial magnetism sensor. The sensors can be integrated into a single chip or separately implemented.

The control unit 170 controls overall operations of the mobile terminal 100, signal flows among the internal components of the mobile terminal 100, data processing, and power supply from the battery to the components. The control unit 170 is capable of including a main memory for storing the booting program, OS, and applications, and a cache memory for storing data to be written into the storage unit 130 and the data read from the storage unit 130 temporarily, a CPU, and a GPU.

The CPU is the main control unit of a computer system for performing operation and comparison on data and interpreting and executing commands. The GPU is for performing operation and comparison on the graphic data and interpreting and executing commands related to the graphic data instead of the CPU. Each of the CPU and GPU can be manufactured as a package of two or more independent cores (such as quad-core). The CPU and GPU may be integrated in the form of System on Chip (SoC). The CPU and GPU may also be multilayer-packaged. The structure of the CPU and GPU can be referred to as Application Processor (AP).

Figure 4A:
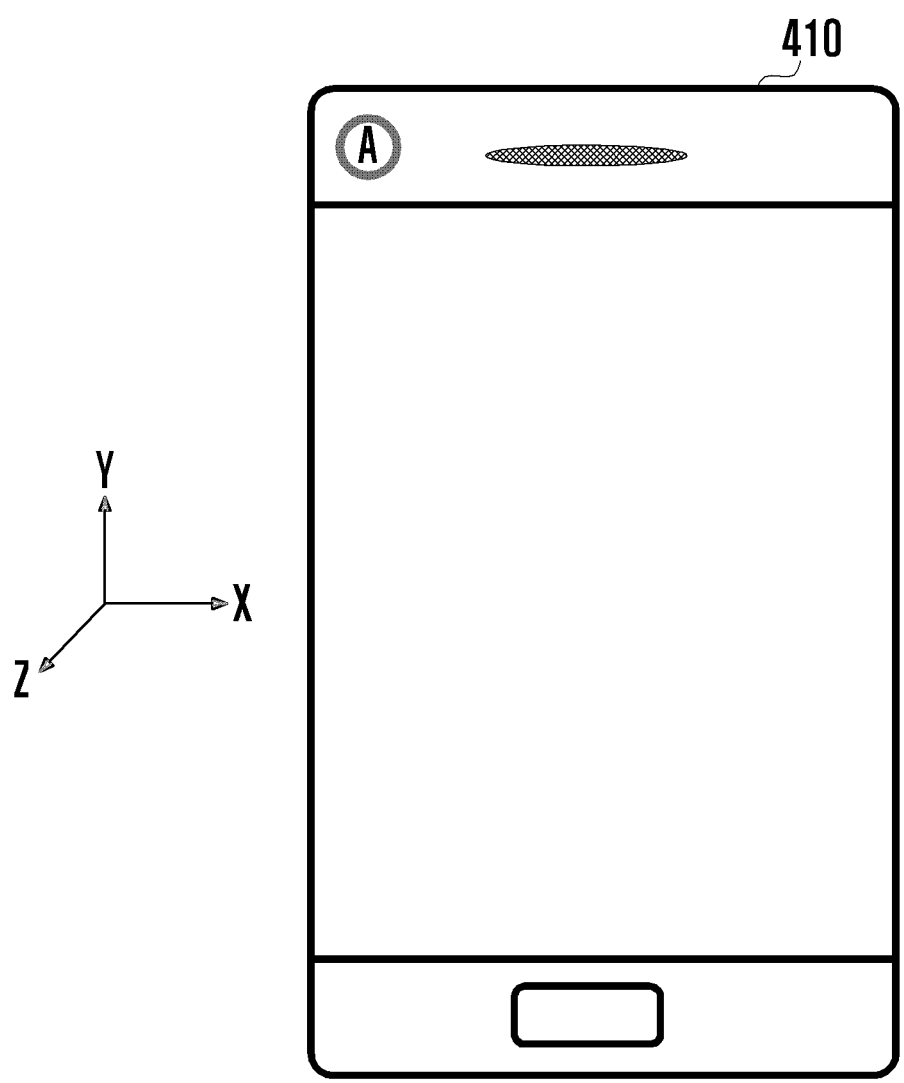

The control unit 170 calculates the tilt of the mobile terminal 100 based on the sensing information (such as acceleration information) provided by the sensing unit 160. The tilt consists of a roll angle ($\phi$), a pitch angle ($\theta$), and a yaw angle ($\psi$). The roll angle ($\phi$) is a rotation angle on the X axis, the pitch angle ($\theta$) on the Y axis, and the yaw ($\psi$) on the Z axis, as shown in FIG. 4A. If the mobile terminal 100 is not in motion, the control unit 170 receives the gravity acceleration information from the sensing unit 160. For example, if the X and Y axes accelerations are 0 m/sec2 and Z axis acceleration is +9.8 m/sec2 in the acceleration information received form the sensing unit 160, the control unit 170 determines the tilt (φ, θ, ψ) of the mobile terminal 100 as (0, 0, 0). In this manner, the tilt of the mobile terminal 100 is calculated.

The control unit 190 is capable of calculating the tilt of the mobile terminal 100 using the posture calculation algorithm based on Euler's angle or an extended Kalman filter and the acceleration prediction-switching algorithm. That is, the tilt calculation method of the mobile terminal 100 can be implemented based on various algorithms. The control unit 170 calculates the 3-dimensional coordinates (x, y, z) of the mobile terminal 100 using the calculated tilt. The control unit 170 determines the posture of the mobile terminal using the calculated tilt or the 3-dimensional coordinates.

The mobile terminal login control method of the control unit 170 is described in detail with reference to accompanying drawings.

Although not enumerated herein, the mobile terminal 100 is capable of further including at least one of a GPS module, a vibration motor, an external device interface (such as an earphone jack), and other accessories such as the peripheral components detachable from the mobile terminal, including a stylus pen for touchscreen-based input. The mobile terminal 100 can be implemented without any of the above-described components or by replacing specific components with other ones depending on the type of the mobile terminal.

Figure 2:
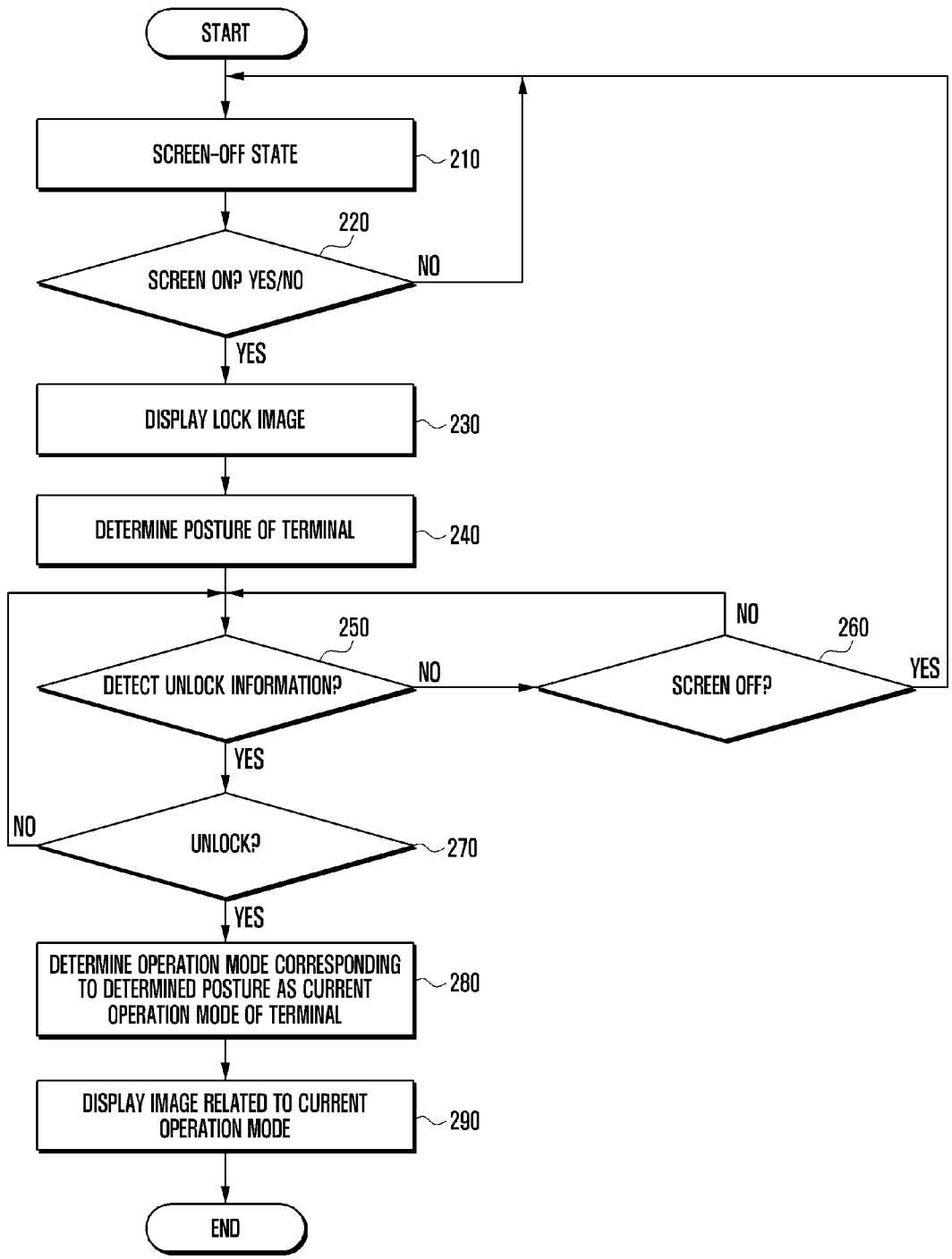
FIG. 2 is a flowchart illustrating the login control method according to an embodiment of the present invention.

FIG. 2 is a flowchart illustrating the login control method according to an embodiment of the present invention. FIGS. 3A to 3C, 4A, 4B, 5A, and 5B are diagrams illustrating screen images displayed in association with the login control method according to an embodiment of the present invention.

Figure 3A:
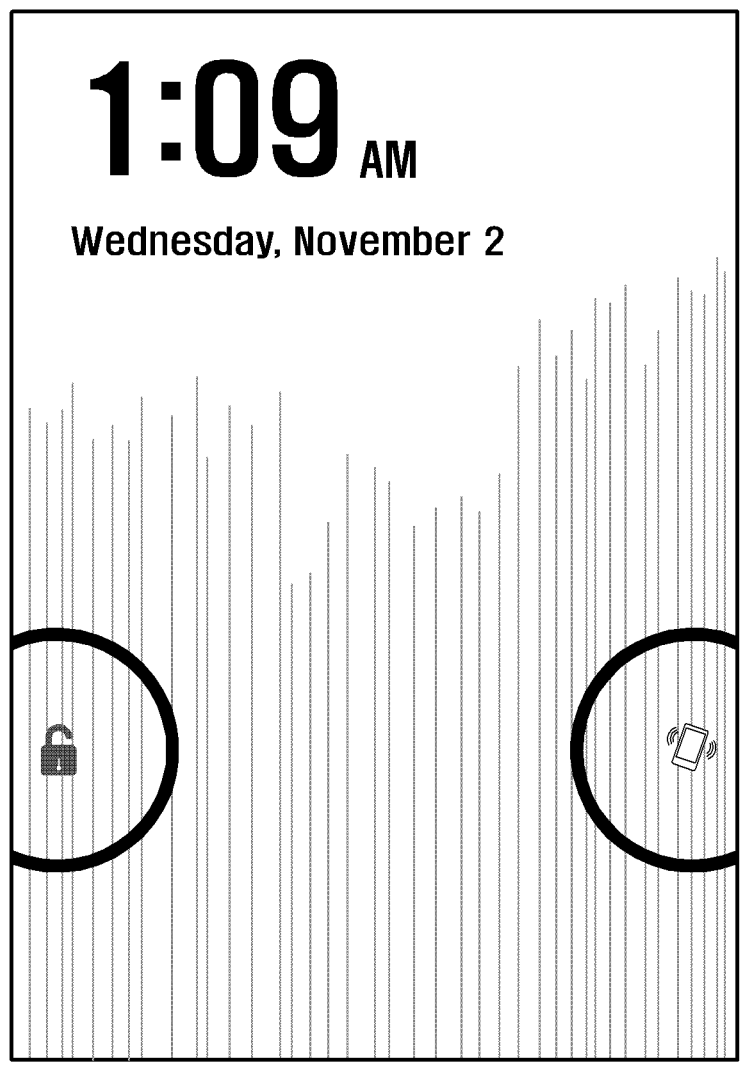
FIGS. 3A to 3C, 4A, 4B, 5A, and 5B are diagrams illustrating screen images displayed in association with the login control method according to an embodiment of the present invention.
Figure 3B:
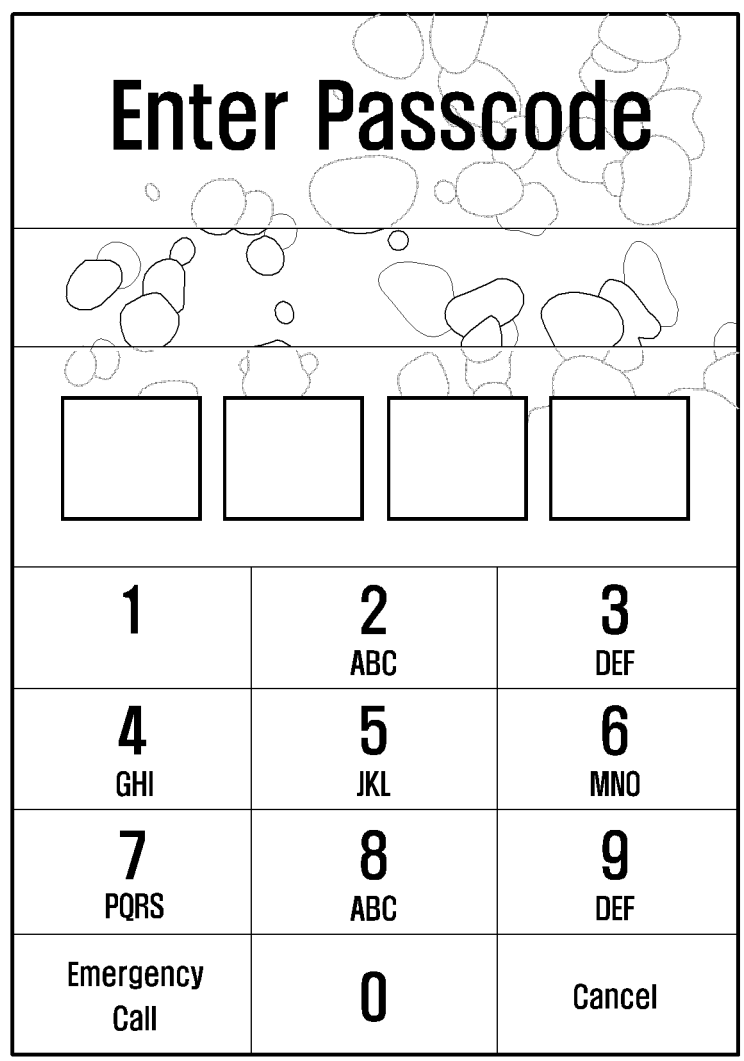
Figure 3C:
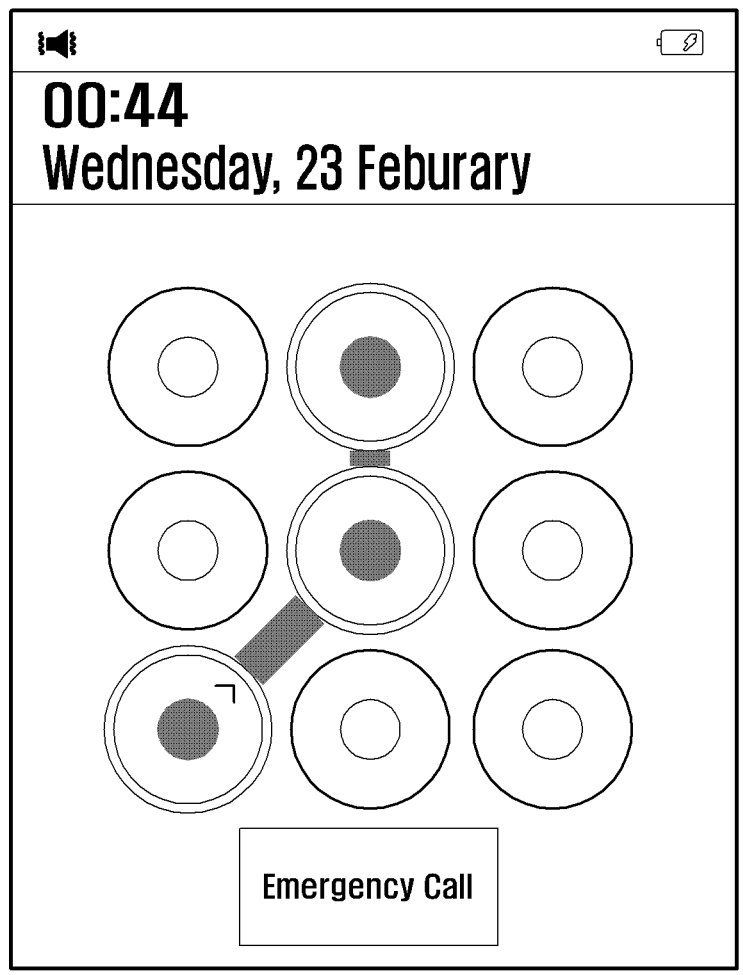

Referring to FIG. 2, the screen of the mobile terminal 100 is off for power saving at step 210. That is, no image is displayed on the screen. The control unit 170 is monitoring to detect a key signal for turning on the screen at step 220. If no screen-on key signal is detected, the control unit 170 controls maintaining the screen-off state. Otherwise, if a screen-on key signal is detected, the control unit 170 controls the display unit 110 to display a lock image on the screen at step 230. For example, the display unit 110 displays a lock image as shown in FIGS. 3A to 3C.

Figure 4B:
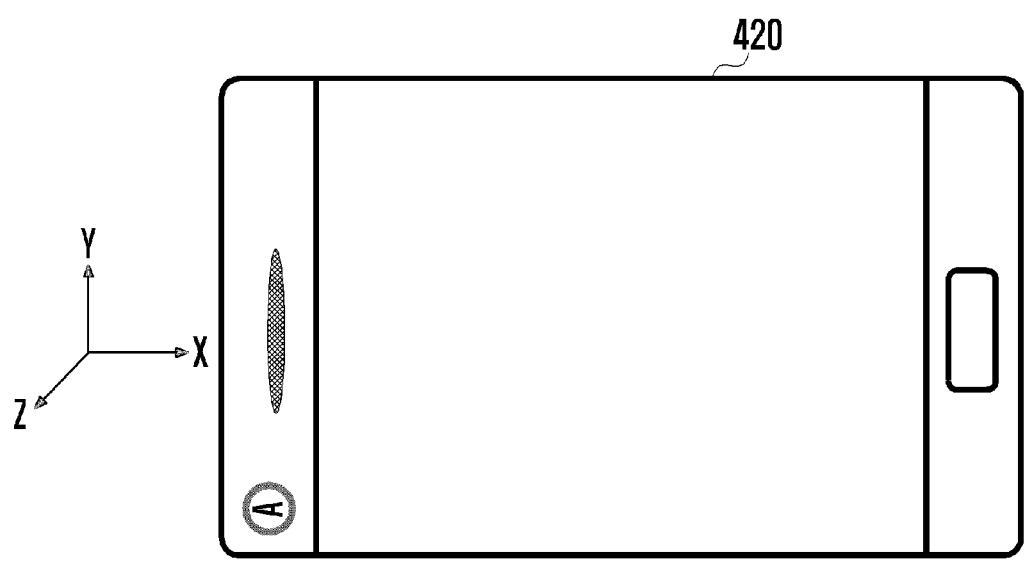

The control unit 170 determines the posture of the mobile terminal 100 at step 240. For example, if the 3-dimensional coordinates of the calculated mobile terminal 100 are (130, −55, 2), the posture is determined as "the first side 410 of the mobile terminal 100 is oriented along the Y axis direction" as shown in FIG. 4A. If the 3-dimensional coordinates of the calculated mobile terminal 100 are (46, −2, 80), the posture is determined as "the second side 420 is oriented along the Y axis direction" as shown in FIG. 4B.

The control unit 170 determines whether unlock information (i.e. login information) is detected at step 250. The unlock information can be a text input by means of a keypad presented on the screen or the key input unit 120 (such as 1234) or a track, a direction, or a type of a touch gesture made on the screen of the display unit 110. The unlock information can be voice data. That is, the MIC converts the speech of the user to an audio signal and sends the audio signal to the audio processing unit 150, and the audio processing unit 150 converts the analog audio signal input through the MIC into a digital audio signal and sends the digital audio signal to the control unit 170. The control unit 170 receives the voice data from the audio processing unit 150 and converts the voice data to text.

If no unlock information is detected, the method proceeds to step 260, where the control unit 170 determines whether a screen-off key signal is detected. If no screen-off key signal is detected, the control unit 170 returns the method to step 250. If the screen-off key signal is detected, the control unit 170 cuts off the power supply to the display unit 110 to turn off the screen. That is, if the screen-off key signal is detected, the method returns to step 210. Otherwise, if no touch event occurs in a time duration since the time point when the lock image is displayed, the method returns to step 210.

If the unlock information is detected at step 250, the control unit 170 determines whether to unlock the mobile terminal at step 270. If the detected unlock information matches the previously stored unlock information, the control unit 170 determines the operation mode of the mobile terminal in correspondence with the determined posture. For example, if it is determined that the mobile terminal 100 is in the posture as shown in FIG. 4A, the operation mode of the mobile terminal 100 is determined as the limited operation mode.

Figure 5A:
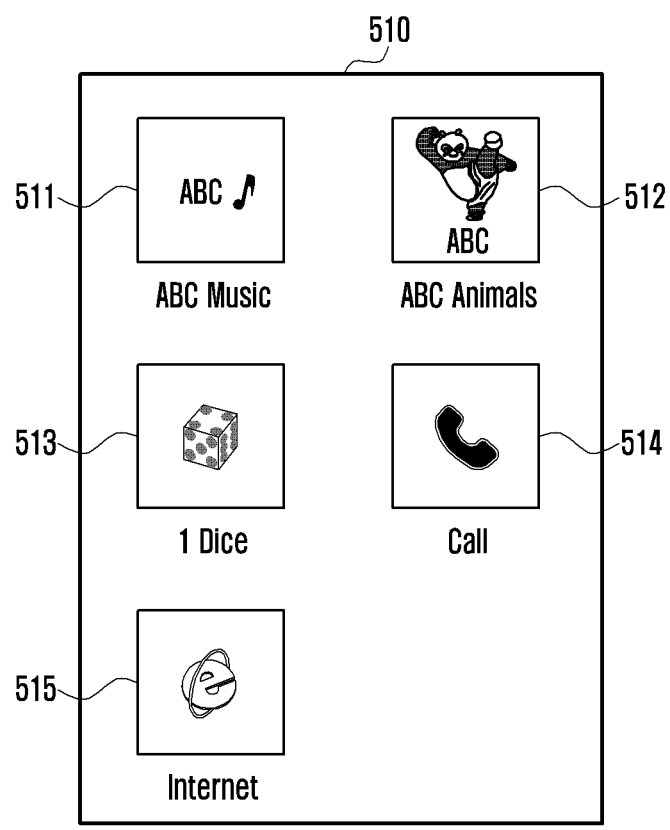
Figure 5B:
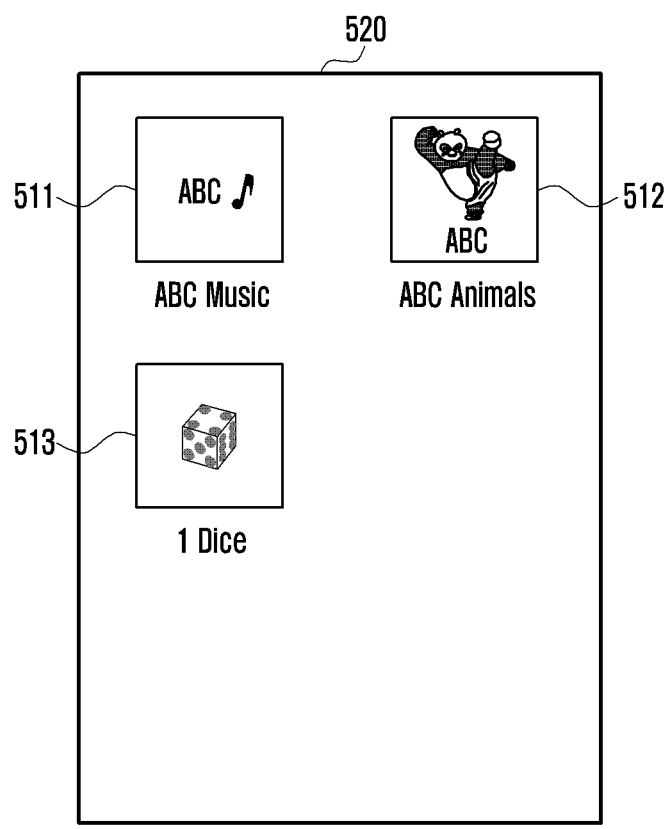

The control unit 170 controls the display unit to display the image representing the determined operation mode at step 290. For example, if the determined operation mode is the limitless operation mode, the display unit 110 displays the first image 510 as shown in FIG. 5A. Otherwise, if the determined operation mode is the limited operation mode, the display unit 110 displays the second image 520 as shown in FIG. 5B. The first image 510 includes a music application icon 511, a first game application icon 512, a second game application icon 513, a voice call application icon 514, and a web browser icon 515. The second image 520 excludes the voice call application icon 514 and the web browser icon 515. That is, the voice call and Internet access are restricted in the limited operation mode.

In the limited operation mode, the voice call application icon 514 and the web browser icon 515 can be displayed. However, the corresponding icons are disabled. For example, if the voice call application icon 514 is touched, the control unit 170 controls the display unit 110 to display an alarm message of "voice call is limited".

In the limited operation mode, functions of a certain application can be executed. For example, the control unit 110 displays an inbound call reception icon but not an outbound call-placing icon under the control of the control unit 170. The outbound-call-placing icon can be presented; however, this icon is disabled such that, when it is selected, the control unit 170 controls the display unit 110 to display the alarm message of "outbound call is restricted".

In the limited operation mode, only the contents are displayed. For example, the display unit 110 displays the thumbnail images of the pictures belonging to a first group while skipping display of the thumbnail images of the pictures belonging to a second group under the control of the control unit 170.

Figure 6:
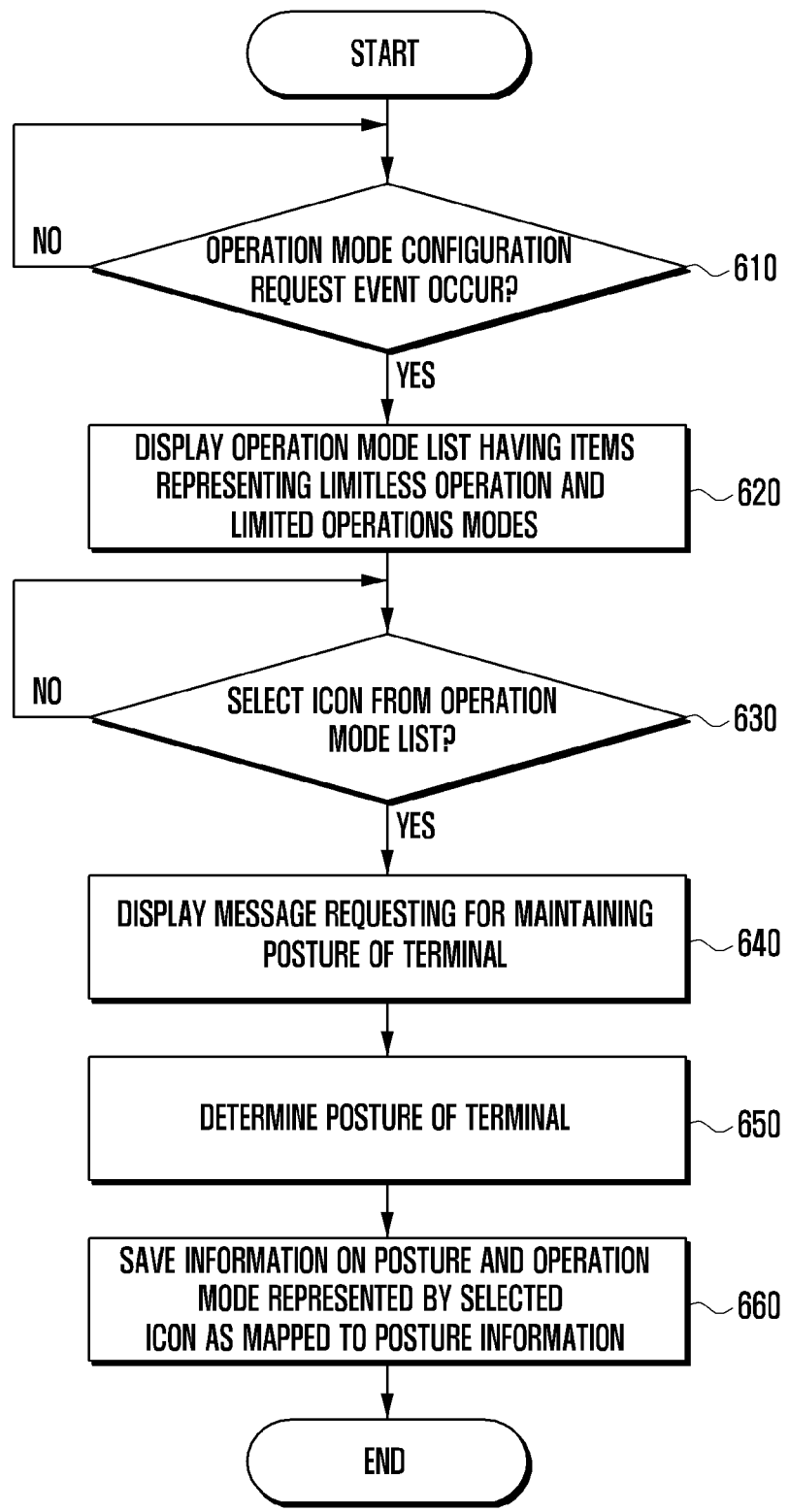
FIG. 6 is a flowchart illustrating a login control method according to another embodiment of the present invention.
Figure 7:
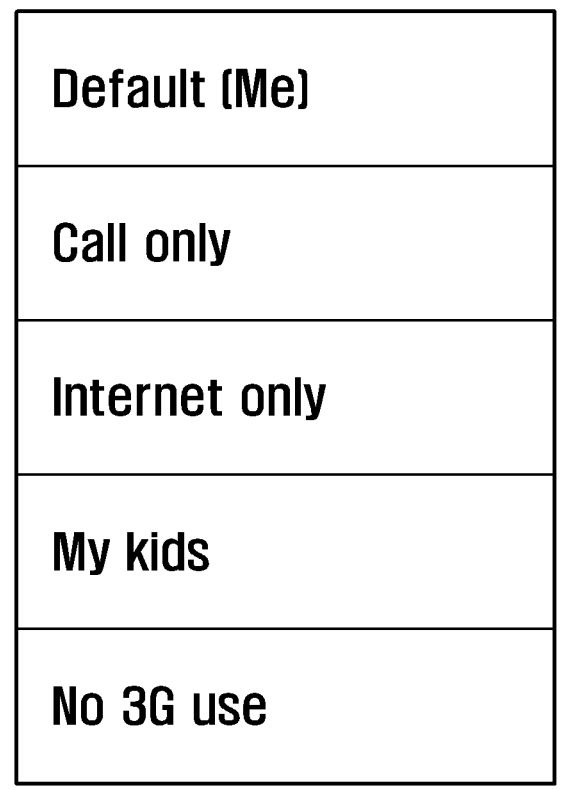
FIG. 7 is a diagram illustrating an operation mode list for use in the login control method of FIG. 6.

FIG. 6 is a flowchart illustrating a login control method according to another embodiment of the present invention. FIG. 7 is a diagram illustrating an operation mode list for use in the login control method of FIG. 6.

Referring to FIG. 6, the control unit 170 is monitoring to detect an event for setting the operation mode at step 610. This event can be a user gesture (such as tap on an operation mode setting button displayed on the screen), a key event occurred by means of the key input unit 130, or a voice data input. For example, the control unit 170 receives a voice data from the audio processing unit 150, converts the received voice data to a text, and determines, if the text includes 'login' and 'setting', that the operation mode setting request event has occurred.

If it is determined that the operation mode setting request event has occurred, the control unit 170 controls the display unit 110 to display a list of the operation modes on the screen at step 620. The operation mode list includes items representing the limitless operation mode and at least one limited operation mode. Referring to FIG. 7, the operation mode list includes "Default (me)" as the limitless operation mode, "Call only" as the first limited operation mode for limiting the usage right of the mobile terminal 100 to the voice call function, "Internet only" as the second limited operation mode for limiting the usage right of the mobile terminal 100 to Internet access, "My kids" as the third limited operation mode for limiting the usage right of the mobile terminal 100 to the applications for kids (such as game applications), and "No 3G use" as the fourth limited operation mode for blocking the 3G use.

The control unit 170 monitors to detect a user input for selecting an operation mode from the operation mode list at step 630. If the user selects an operation mode (such as tap a corresponding item), the control unit 170 controls the display unit 110 to display a message requesting for maintaining the posture of the mobile terminal 100 at step 740. The control unit 170 determines the posture of the mobile terminal 100 at step 650. The control unit 170 controls such that the information on the posture (such as "the second side 410 is oriented along the Y axis direction" as shown in FIG. 4B) is mapped to the operation mode represented by the selected item (such as My kids) and stored in the storage unit 130 along with the mapping information at step 660.

Figure 8:
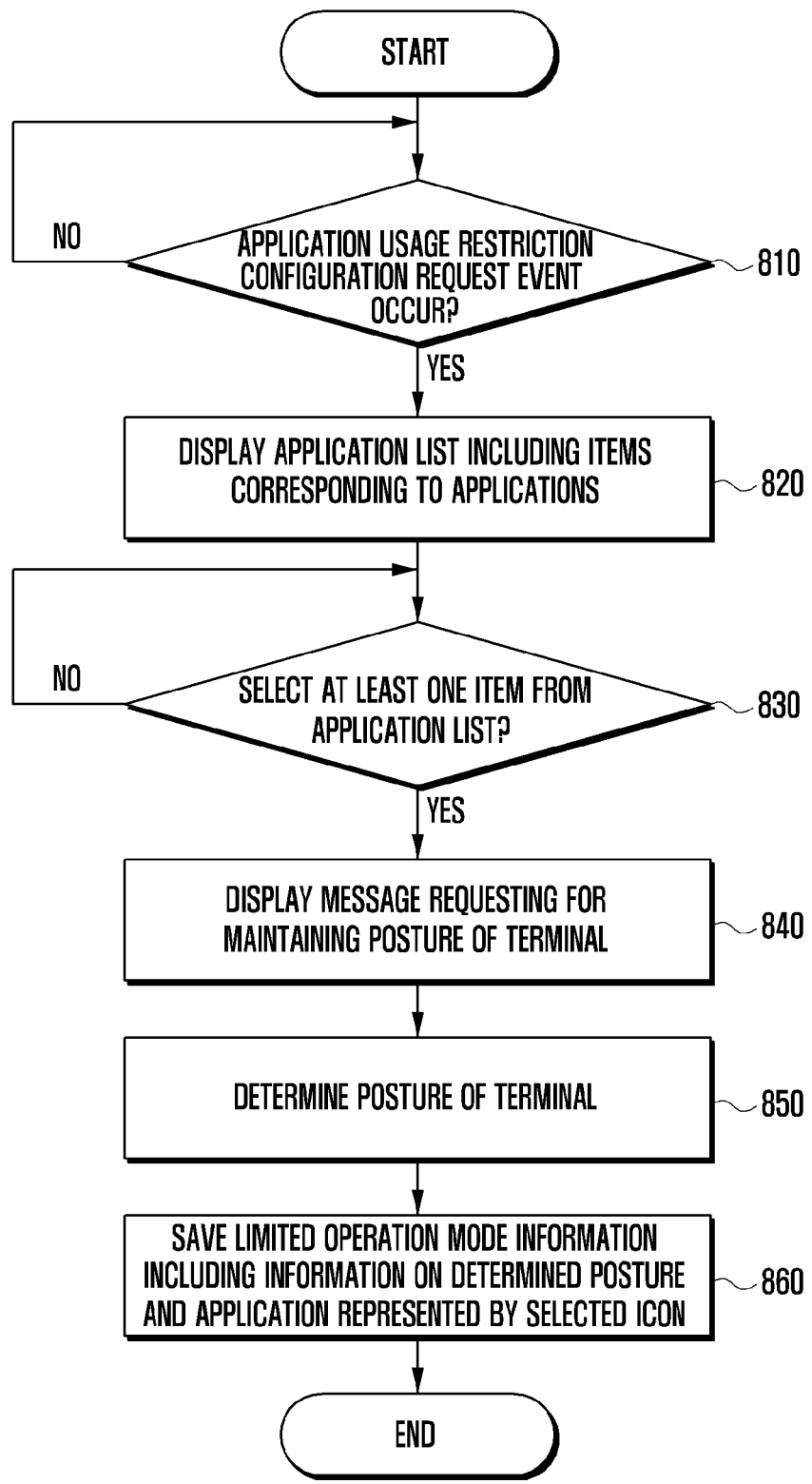
FIG. 8 is a flowchart illustrating a login control method according to another embodiment of the present invention.
Figure 9:
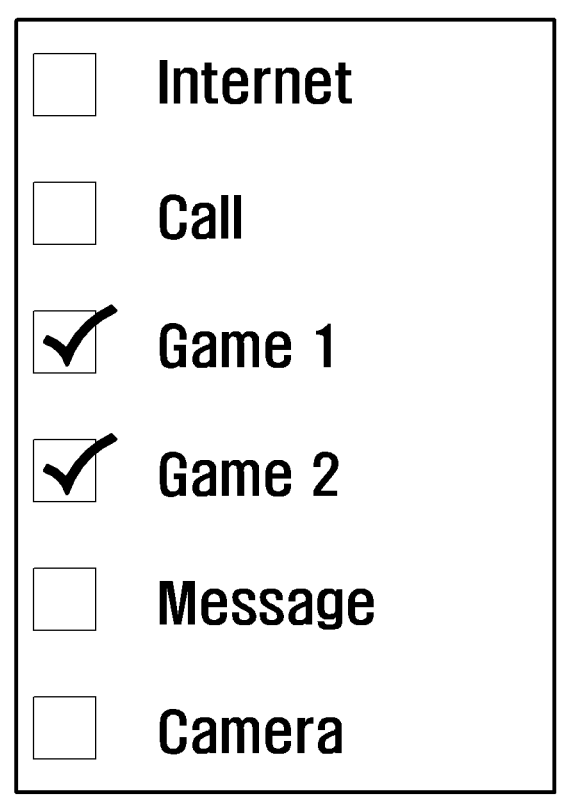

FIG. 8 is a flowchart illustrating a login control method according to another embodiment of the present invention. FIG. 9 is a diagram illustrating an operation mode list for use in the login control method of FIG. 8.

Referring to FIG. 8, the control unit 170 monitors to detect whether an event is occurred for requesting the application usage restriction setting at step 810. This event can be a user gesture (such as tap on an operation mode setting button displayed on the screen) or a key event occurred by means of the key input unit 130.

If the application usage restriction request event is detected, the control unit 170 controls the display unit 110 to display a list of applications at step 820. The application list may include the items representing the respective applications. The application list of FIG. 9 includes "Internet" representing a web browser application, "Call" representing a voice call application, "Game 1" representing a first game application, "Game 2" representing a second game application, "Message" representing a messaging application, and "Camera" representing a camera application.

The control unit 170 monitors to detect a selection of an application (or application item) from the application list at step 830. If the user selects an item (such as tap to the check boxes of Game 1 and Game 2), the control unit 170 controls the display unit 110 to display a message requesting for maintaining the posture of the mobile terminal 100 at step 840. The control unit 170 determines the posture of the mobile terminal 100 at step 850.

The control unit 170 controls the storage unit 130 to store the limited operation mode information at step 860. The limited operation mode information is capable of including the posture information (such as "the second side 420 of the mobile terminal 100 is oriented along the Y axis" as shown in FIG. 4B) and the information on the application (such as first and second game applications) corresponding to the selected items.

When the mobile terminal is unlocked, the posture of the mobile terminal 100 matches the posture as shown in FIG. 4B, and the usage right of the mobile terminal 100 is limited to the first and second game applications. In contrast, the usage right of the mobile terminal 100 can be limited to the applications with the exception of the first and second game applications.

Although the description is directed to the usage restriction of applications, the present invention can be applied for usage restriction of functions and contents. For example, when a usage restriction setting request event is detected, the control unit 170 controls the display unit 110 to display a list of functions or contents on the screen. The function list may include items representing an inbound call reception function, an outbound call-placing function, an inbound message-checking function, and an outbound message transmission function. The content list may include icons (or thumbnail images) corresponding to the pictures taken by means of the camera module.

The control unit 170 is capable of controlling the storage unit 130 to store the limited operation mode information including the information on the functions corresponding to the icon selected from the function list and the information on the posture of the mobile terminal 100. The control unit 170 is also capable of controlling the storage unit 130 to store the limited operation mode including the information on the contents corresponding to the icons selected from the content list and the information on the posture of the mobile terminal 100.

Figure 10:
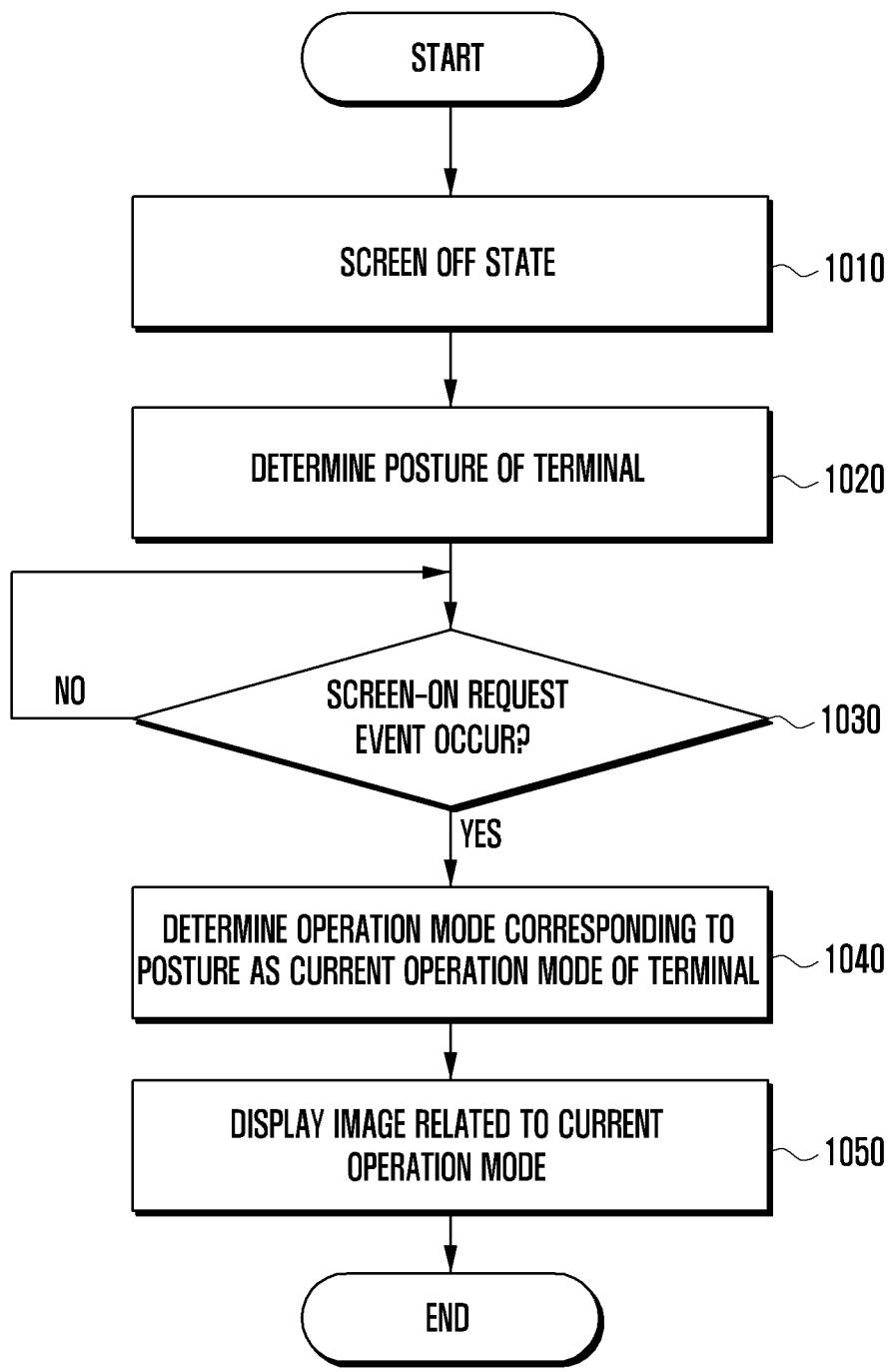
FIG. 10 is a flowchart illustrating the login control method according to another embodiment of the preset invention.

FIG. 10 is a flowchart illustrating the login control method according to another embodiment of the preset invention.

Referring to FIG. 10, the screen of the mobile terminal 100 is in off state at step 1010. The control unit 170 determines the posture of the mobile terminal at step 1020. That is, the control unit 170 controls to supply power to the sensing unit 160, which senses the physical quantity (such as acceleration) and the displacement of the physical quantity to generate the sensing information to the control unit 170. The control unit 170 calculates the tilt based on the sensing information and determines the posture of the mobile terminal 100 based on the calculated tilt.

The control unit 170 monitors to detect an event requesting for screen-on at step 1030. This request event can be a key event (such as power-on key event) input by means of the key input unit 130, or voice data. That is, the control unit 170 receives voice data from the audio processing unit 150, converts the voice data to a text, and determines, if the text includes the words 'screen' and 'on', that the unlock request event has occurred.

If this event is detected, the control unit 170 determines the operation mode of the mobile terminal based on the determined posture at step 1040. The control unit 170 controls the display unit 110 to display an image representing the determined operation mode at step 1050. If the mobile terminal 100 is unlocked when the lock image is displayed, the display unit 110 displays an image representing the determined operation mode instead of the lock image.

As described above, the login control method and mobile terminal of the present invention facilitates authenticating mobile terminal usage right of the user in unlocking the mobile terminal, resulting in improvement of user convenience.

The above-described login control method of the present invention can be recorded in a computer-readable storage media in the form of program commands executable by means of various types of computing means. The computer-readable storage media can store the program commands, data files, and data structures independently or in the form of their combination. The program commands recorded in the storage media can be designed and configured for dedicated use in the present invention or the ones well-known to those in the computer software field. The computer-readable media may be magnetic media such as a hard disk, a floppy disk and magnetic tape, optical media such as a compact disk read-only memory (CD-ROM) and a digital versatile disk (DVD), magneto-optical media such as floptical disk, and hardware devices such as a Read-Only Memory (ROM), a random-access memory (RAM), a flash memory, etc., particularly implemented to store and execute program commands. The program commands may be machine language codes produced by a compiler and high-level language codes that can be executed by computers using an interpreter, etc. In order to perform the operations of the present invention, the hardware devices may be implemented to operate as at least one software module, and vice versa.

Although embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims.

While the invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A login control method, comprising:
   determining, when a lock image is displayed on a screen, a posture of a mobile terminal;
   detecting unlock information;
   comparing the detected unlock information with registered unlock information;
   selecting, when the detected unlock information and the registered unlock information are identical to each other, an operation mode corresponding to the posture of the mobile terminal, from a plurality of operation modes, as a current operation mode;
   determining at least one executable application corresponding to the current operation mode; and
   displaying an image comprising at least one visual element corresponding to the at least one executable application,
   wherein displaying the image comprises presenting, when the current operation mode is a limitless operation mode, a first image representing the limitless operation mode and, when the current operation mode is a limited operation mode, a second image representing the limited operation mode,
   wherein the second image includes at least one visual element with the exception of at least one of visual elements included in the first image, and
   wherein the posture of the mobile terminal is determined based on each of rotation angles relative to x- y- and z-axes, respectively.

2. The login control method of claim 1, wherein the image representing the current operation mode comprises at least one of a visual element corresponding to an application and a visual element corresponding to content and, when the current operation mode is the limited operation mode, applications represented by the visual element corresponding to the application and content represented by the visual element corresponding to the content are limited in use.

3. The login control method of claim 1, wherein the operation modes comprise the limitless operation mode allowing for use of all applications and content in the mobile terminal and at least one limited operation mode allowing for use of only preset applications and contents among all applications and content.

4. A mobile terminal, comprising:
   a display unit;
   a sensor configured to sense a posture of the mobile terminal; and
   processor configured to:
      determine a posture of the mobile terminal based on sensing information provided by the sensor;
      detect unlock information when a lock image is displayed on a screen of the display unit;
      compare the detected unlock information with registered unlock information;
      select, when the detected unlock information and the registered unlock information are identical to each other, an operation mode corresponding to the posture of the mobile terminal among a plurality of registered unlock operation modes as a current operation mode of the mobile terminal;
      determine at least one executable application corresponding to the current operation mode; and
      control the display unit to display an image related to the current operation mode,
   wherein the processor controls the display unit to display, when the current operation mode is a limitless operation mode, a first image representing the limitless operation mode and, when the current operation mode is a limited operation mode, a second image representing the limited operation mode,
   wherein the second image includes at least one visual element with the exception of at least one of visual elements included in the first image, and
   wherein the sensing information includes each of rotation angles relative to x- y- and z-axes, respectively.

5. The mobile terminal of claim 4, wherein the image related to the current operation mode comprises at least one of a visual element corresponding to an application and a visual element corresponding to content and, when the current operation mode is the limited operation mode, applications represented by the visual element corresponding to the application and content represented by the visual element corresponding to the content are limited in use.

6. The mobile terminal of claim 4, wherein the operation modes comprise the limitless operation mode allowing for use of all applications and content in the mobile terminal and at least one limited operation mode allowing for use of only preset applications and content among all applications and content.

7. The mobile terminal of claim 4, wherein the processor detects the unlock information through at least one of a touch panel, a key input unit, and a microphone.

* * * * *